United States Patent [19]

Mandelcorn

[11] Patent Number: 4,855,665
[45] Date of Patent: Aug. 8, 1989

[54] STATUS INDICATING CIRCUIT FOR PARALLELED SWITCHING POWER SUPPLIES

[75] Inventor: Josh Mandelcorn, Los Angeles, Calif.

[73] Assignee: Pioneer Magnetics, Inc., Santa Monica, Calif.

[21] Appl. No.: 246,158

[22] Filed: Sep. 19, 1988

[51] Int. Cl.⁴ .............................................. G05F 1/569
[52] U.S. Cl. .................................. 323/272; 323/283; 363/41; 363/56
[58] Field of Search ................. 323/271, 272, 282–288; 363/61, 50, 56, 65

[56] References Cited

U.S. PATENT DOCUMENTS

| | | | |
|---|---|---|---|
| 3,824,450 | 7/1974 | Johnson et al. | 323/272 |
| 4,074,182 | 2/1978 | Weischedel | 323/272 |
| 4,194,147 | 3/1980 | Payne et al. | 323/272 |
| 4,359,679 | 11/1982 | Regan | 323/272 |

Primary Examiner—Peter S. Wong
Attorney, Agent, or Firm—Keith D. Beecher

[57] ABSTRACT

A keep-alive circuit for a regulated switched-type power supply for forcing the power supply to generate power pulses under conditions where the apparent output voltage level is such as to cause the regulator circuit normally to reduce the power pulses effectively to zero. The keep-alive circuitry responds to the absence of the power pulses over a predetermined time interval to modify the regulating circuit so that the regulating circuit responds to a different output voltage level to force the power supply to generate a power pulse under the aforesaid conditions. The action is made cyclic and the power supply is thereby caused to generate a series of low frequency power pulses indicating that it is still alive.

5 Claims, 1 Drawing Sheet

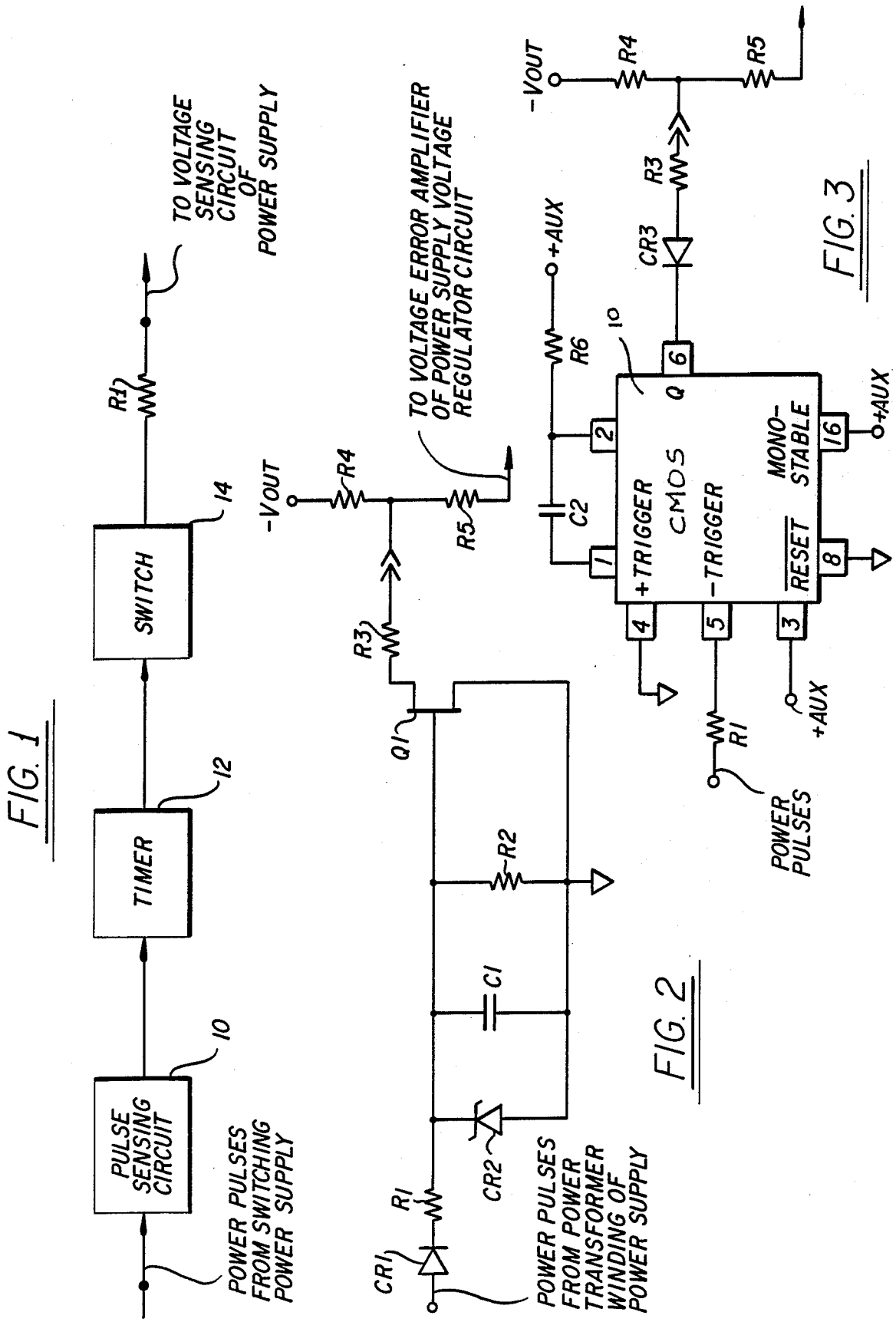

STATUS INDICATING CIRCUIT FOR PARALLELED SWITCHING POWER SUPPLIES

BACKGROUND OF THE INVENTION

Regulated switching power supplies are often operated in parallel. However, when two or more regulated switching power supplies are so operated under usual conditions, less than all of the power supplies will carry the load, and the remaining power supplies will carry no load, unless the load is sufficiently high so that all of the power supplies are required to carry the load.

When the regulated switching-type power supplies are operated in parallel for redundancy purposes, for example, the load does not normally require all of the power supplies, so that the condition exists in that one or more of the power supplies is effectively shut off during normal operation. This is because the reason for the redundancy is to permit the remaining power supplies to carry the full load in the event that one of the power supplies should fail.

The reason why one or more of the paralleled power supplies is effectively shut off in such a redundancy system is because the voltage control regulating circuit in the individual power supply has virtually infinite gain for direct current. Accordingly, if the voltage setting of any one power supply falls below the voltage setting of the other power supplies, even by less than 1 millivolt, its voltage regulating circuit will cut the supply duty cycle of the particular power supply to zero.

As is well known, switching power supplies provide output pulses which are width modulated by their voltage regulating circuits to establish the output voltage of the power supplies. When the duty cycle of any individual power supply is reduced to zero, the output pulses from that power supply disappear.

However, the disappearance of the output pulses from any particular power supply may mean either that the particular power supply has failed or has no input power; or that the particular power supply is fully operational, but that its output voltage has been regulated to a value slightly below the voltage of the other paralleled power supplies so as to reduce its duty cycle to zero.

It is essential in the redundancy-type system of the type described above, that the operator be informed at all times that all of the power supplies are operational. Then, if any one of the individual power supplies has failed, it can be removed from the system and replaced.

Such knowledge is also important in parallel systems with forced current sharing in order that a failed power supply can be disconnected from the current sharing system before it drags down the common output.

"Keep alive" circuits have been proposed in the prior art in an attempt to determine whether any of the individual regulated switching power supplies in a paralleled system have failed. These prior art "keep alive" circuits attempt to override the voltage control regulating circuit in the individual power supplies by forcing a minimum duty cycle in each power supply. Accordingly, for each power supply, so long as the power pulses appear, the supply is operational. However, when no power pulses appear, the indication is that the particular power supply has failed.

The prior art "keep alive" circuit forces a minimum duty cycle on the pulse width modulator of the corresponding power supply even when the voltage regulator circuit indicates that the output voltage is too high. This creates a problem in that a substantial minimum load is required to prevent the power supply output from going extremely high. This is because the power switch must be turned on every cycle.

Another problem with the prior art "keep alive" circuit is that it is difficult to force a minimum duty cycle in the most commonly used integrated circuit pulse width modulators, such as the TL494.

The problems encountered by the prior art "keep alive" circuits are overcome in the system of the present invention by introducing a minimum pulse rate to the switching power supply power output pulses, rather than by attempting to force a minimum duty cycle.

BRIEF DESCRIPTION OF THE DRAWINGS

FIG. 1 is a block diagram illustrating the concept of the "keep alive" circuit of the present invention;

FIG. 2 represents one specific implementation of the "keep alive" circuit of the invention; and FIG. 3 represents another specific implementation of the circuit.

DETAILED DESCRIPTION OF THE ILLUSTRATED EMBODIMENTS

The block diagram of FIG. 1 includes a pulse sensing circuit represented by the block 10 which is connected to a corresponding switching power supply and which senses the power pulses from the power supply. Block 10 is connected to a timer represented by block 12, and applies reset pulses to the timer. Timer 12, in turn, is connected to a switching citrcuit represented by block 14, and the switching circuit is connected to a resistor R1 included in the voltage sensing circuit of the power supply regulator. This circuit senses the output voltage of the power supply to provide an error voltage which is applied to an error amplifier in the voltage regulator circuit of the power supply.

In the system of FIG. 1, pulse sensing circuit 10 provides output pulses so long as the corresponding power supply produces power pulses which are subsequently rectified to provide a direct current voltage output. The lack of output pulses from the pulse sensing circuit 10 is detected by timer 12. If no pulses appear for a given time, for example 200 microseconds, the timer is not reset and switching circuit 14 becomes conductive. When switching circuit 14 is conductive, the voltage regulator circuit of the power supply is modified to cause it to react as if the voltage output, for example, is too low. This forces a power pulse from the power supply if the power supply is still operational. The power pulses sensed by the pulse sensing circuit 10 serve to reset the timer 12 and render switching circuit 14 non-conductive. The power pulse ends shortly thereafter and timer 12 again starts up and the cycle is repeated.

The system of FIG. 1, accordingly, reacts in the event that the power supply during normal operation fails to produce power pulses, and it provides a minimum pulse rate which is detected by suitable circuitry to establish that the power supply is still alive, if such is the case.

Since the system of FIG. 1 only senses the power pulses of the power supply, and since it only modifies the voltage sensing circuit of the power supply voltage regulator, the circuit may be used in conjunction with the pulse width modulator in any existing switched power supply. Also, since the system of FIG. 1 outputs a pulse only once for several switching cycles, a very small minimum load is required.

A first implementation of the system of FIG. 1 is shown in the circuit of FIG. 2. In the circuit of FIG. 2 the pulse sensing circuit 10 of FIG. 1 is formed of a diode CR1 and resistor R1. Resistor R1 may have a value, for example, of 20 kilo-ohms. It is connected to the gate electrode of a J271 junction field effect transistor (FET) $Q_1$ which is included in switching circuit 14 of FIG. 1. Resistor R1 is connected to a grounded 0.01 microfarad capacitor C1 and to a grounded 15 kilo-ohm resistor R2 which form timer 12. The source electrode of FET $Q_1$ is grounded, and the drain electrode is connected through a 3 kiloohm resistor R3 to the resistor train R4, R5 of the voltage regulator circuit associated with the power supply.

The resistors R4 and R5 sense the output voltage of the power supply and supply an error voltage to the error amplifier of the voltage regulator circuit to cause the regulator circuit to attempt to maintain the output voltage of the power supply at a constant level.

In the circuit of FIG. 2, the power pulses developed in the power supply are sensed by the circuit of diode CR1 and resistor R1, and pulses are introduced to the timing circuit formed by capacitor C1 and resistor R2. The pulses charge capacitor C1 up to a 6.8 volt maximum, for example, which is limited by Zener diode CR2.

The presence of power pulses in the power supply keeps the voltage on the gate of FET switch Q1 high, and consequently the FET switch remains off. Under such conditions the regulating voltage circuit of the power supply operates normally.

Now, should the power pulses in the power supply disappear for any reason, the gate voltage of FET Q1 will decay until it is low enough so that the FET switch Q1 is turned on.

The time required for the gate voltage of FET Q1 to decay depends upon the time constant of C1, R2. Specifically, the time required is approximately 150 microseconds in the particular circuit of FIG. 2 for the gate voltage to drop below 1.5 volts.

When the FET switch Q1 is turned on, one side of resistor R3 is pulled to ground. Since resistor R3 is connected to the voltage sense resistor chain of the voltage regulator circuit of the power supply, this action causes the sensing of the output voltage of the power supply to be changed to simulate a drop in output voltage. Accordingly, the voltage error amplifier in the voltage regulator circuit of the power supply causes the pulse width modulator to output a power pulse if the power supply is operational.

The resulting power pulse is detected by appropriate circuitry to indicate that the power supply is alive. The power pulse is also fed back to the pulse sensing circuit 10 (FIG. 1) to reset timer 12 and repeat the cycle.

Another implementation of the system is shown in FIG. 3. The circuit of FIG. 3 includes a CMOS integrated circuit 10 which may be one-half a CD4098. The pins of integrated circuit 10 are appropriately numbered. Pins 4 and 8 are grounded. Pins 3 and 16 are connected to the positive terminal of the an auxiliary voltage source. The detected power pulses are introduced, as in the previous embodiment, through resistor R1, in the present instance, to pin 5. Pins 1 and 2 are intercoupled by a 0.022 capacitor C2, and pin 2 is connected through a 15 kilo-ohm resistor R6 to the positive terminal of the auxiliary source. Pin 6 is connected through a diode CR3, and through resistor R3 to the resistor chain R4, R5, as in the previous embodiment.

In the circuit of FIG. 3, the CMOS integrated circuit 10 provides a one-shot (monostable) multivibrator. Resistor R1, together with the input circuitry of CMOS 10 serves as the power pulse sensing detector circuit 10 of FIG. 1. The capacitor C2 and resistor R6 together with the oneshot multivibrator of CMOS 10 serve as the timer 12.

The circuit of FIG. 3 provides a more stable and predictable time delay than the circuit of FIG. 2. The time delay $\gamma = \frac{1}{2} C1 \times R2 = 200$ microseconds in the particular circuit. The output Q of the one-shot, together with diode CR3, form the output switch 14 of FIG. 1.

As long as power pulses appear at the input to resistor R1, the one-shot of CMOS 10 remains in its "on" state and the voltage Q (pin 6) remains high. During this condition, diode CR3 is back-biased and the voltage regulator circuit of the power supply operates in its normal mode.

However, if the power pulses should disappear, the CMOS one-shot will time out after 200 microseconds and be triggered to its "off" state. Then, the voltage Q at pin 6 will go low. Diode CR3 will now conduct and pull resistor R3 low. This produces the same reaction in the voltage regulator circuit as the circuit of FIG. 2.

While particular embodiments of the invention have been shown and described, modifications may be made. It is intended in the claims to cover all modifications which come within the spirit and scope of the invention.

I claim:

1. In a regulated power supply which includes pulse generating means for producing power pulses for establishing an output voltage, and which further includes an output voltage sensing circuit for regulating the output voltage by modulating the power pulses as a function of the output voltage level, a keep-alive circuit for maintaining said power pulses under a condition where the output voltage assumes an apparent level which would cause the output voltage sensing circuit normally to reduce the power pulses to zero, said keep-alive circuit comprising: output circuit means connected to said output voltage sensing circuit for modifying said voltage sensing circuit to cause said output voltage sensing circuit to force said generating means to produce a power pulse under the aforesaid condition when said output circuit means is activated; switching circuit means connected to said output circuit means for deactivating said output circuit means whenever said switching circuit means is set to an off condition, and for activating said output circuit means whenever said switching circuit means is set to an on condition; and pulse sensing circuit means connected to said pulse generating means and responsive to said power pulses produced thereby for maintaining said switching circuit means in its off condition in the presence of said power pulses from said pulse generating means which recur within a predetermined time interval and for setting said switching circuit means to its on condition whenever said power pulses effectively disappear for more than said predetermined time interval.

2. The combination defined in claim 1, and which includes a timer circuit interposed between said pulse sensing circuit means and said switching circuit means for causing said switching circuit means to be turned on a predetermined time interval after the effective disappearance of said power pulses and to be subsequently turned off to force said generating means to produce a series of power pulses under the aforesaid condition.

3. The combination defined in claim 2, in which said series of power pulses has a frequency less than the frequency of the power pulses produced by said generating means during normal operation of said power supply.

4. The combination defined in claim 1, in which said switching circuit means includes a field effect transistor (FET).

5. The combination defined in claim 2, in which said input circuit means, said timer circuit means, and said switching circuit means are contained in an integrated circuit.

* * * * *